US009105965B2

(12) United States Patent
Cox et al.

(10) Patent No.: US 9,105,965 B2
(45) Date of Patent: Aug. 11, 2015

(54) TOUCHING AN ANTENNA OF A NEAR FIELD COMMUNICATIONS (NFC) DEVICE TO CONTROL ITS OPERATION

(75) Inventors: David Grant Cox, Newbury (GB); Andrew Pienkowski, St Neots (GB)

(73) Assignee: Broadcom Corporation, Irvine, CA (US)

( * ) Notice: Subject to any disclaimer, the term of this patent is extended or adjusted under 35 U.S.C. 154(b) by 1068 days.

(21) Appl. No.: 13/157,572

(22) Filed: Jun. 10, 2011

(65) Prior Publication Data
US 2012/0315844 A1    Dec. 13, 2012

(51) Int. Cl.
*H04B 5/00* (2006.01)
*H01Q 1/22* (2006.01)
*H01Q 11/12* (2006.01)

(52) U.S. Cl.
CPC ........................................ *H01Q 1/22* (2013.01)

(58) Field of Classification Search
USPC ......................................................... 455/41.1
See application file for complete search history.

(56) References Cited

U.S. PATENT DOCUMENTS

| 2003/0085843 | A1* | 5/2003 | Thursby et al. ............... 343/744 |
| 2004/0183788 | A1 | 9/2004 | Kurashima et al. |
| 2009/0212735 | A1 | 8/2009 | Kung et al. |
| 2010/0267421 | A1 | 10/2010 | Rofougaran |
| 2010/0297952 | A1* | 11/2010 | Rofougaran .................... 455/73 |
| 2012/0083205 | A1* | 4/2012 | Marcu et al. ................. 455/41.1 |
| 2013/0203345 | A1* | 8/2013 | Fisher .......................... 455/41.1 |

FOREIGN PATENT DOCUMENTS

| EP | 2 416 443 A1 | 2/2012 |
| TW | 200642163 A1 | 12/2006 |
| TW | 200937793 A1 | 9/2009 |
| TW | 201011482 A1 | 3/2010 |

OTHER PUBLICATIONS

International Standard: ISO/IEC 21481, *Information technology—Telecommunications and information exchange between systems—Near Field Communication Interface and Protocol-2 (NFCIP-2)*, pp. 1-12, First edition, Reference No. ISO/IEC 21481:2005(E), ISO/IEC (Jan. 2005).

(Continued)

*Primary Examiner* — Ayodeji Ayotunde
(74) *Attorney, Agent, or Firm* — Sterne, Kessler, Goldstein & Forr, P.L.L.C.

(57) ABSTRACT

A near field communications (NFC) device is disclosed that interacts with other NFC devices to exchange information and/or the data. An operator may touch, or be sufficiently proximate to, an antenna module of the NFC device to operate and/or control the NFC device. The antenna module includes antenna components that are characterized by a corresponding characteristic impedance. The touch, or sufficient proximity, of the operator changes the corresponding characteristic impedance of antenna components. The NFC device may determine a location of the touch, or proximity, of the operator based upon this change. The NFC device may interpret the location of the touch, or proximity, of the operator as information from the operator to operate and/or control the NFC device.

20 Claims, 12 Drawing Sheets

(56) References Cited

OTHER PUBLICATIONS

International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

Office Action for related Taiwanese Patent Application No. 10112757, mailed Feb. 27, 2014; 8 pages.

English-language abstract for Taiwanese Patent Application Publication No. 200642163 A1; 1 page.

English-language abstract for Taiwanese Patent Application Publication No. 201011482 A1; 1 page.

European Search Report for EP Patent Application No. EP 12004391, European Patent Office, Munich, Germany, mailed on Aug. 28, 2012.

\* cited by examiner

TOUCHING AN ANTENNA OF A NEAR FIELD COMMUNICATIONS (NFC) DEVICE TO CONTROL ITS OPERATION

BACKGROUND

1. Field of Invention

The invention relates to near field communications (NFC), and more specifically to operating and/or controlling a NFC capable device by touching, or being sufficiently proximate, to its antenna.

2. Related Art

Near field communication (NFC) devices are being integrated into communication devices, such as mobile devices to provide an example, to facilitate the use of these communication devices in conducting daily transactions. For example, instead of carrying numerous credit cards, the credit information provided by these credit cards could be stored onto a NFC device. The NFC device is simply tapped to a credit card terminal to relay the credit information to it to complete a transaction. As another example, a ticketing writing system, such as those used in bus and train terminals, may simply write ticket fare information onto the NFC device instead of providing a ticket to a passenger. The passenger simply taps the NFC device to a reader to ride the bus or the train without the use of a paper ticket.

Generally, NFC requires that NFC devices to be present within a relatively small distance from one another so that their corresponding magnetic fields can exchange information. Typically, a first NFC device transmits or generates a magnetic field modulated with the information, such as the credit information or the ticket fare information. This magnetic field inductively couples the information onto a second NFC device that is proximate to the first NFC device. The second NFC device may respond to the first NFC device by inductively coupling its corresponding information onto the first NFC device.

Operation of the first and the second NFC devices in the manner as described above discharges its internal batteries. Under certain circumstances, a NFC device may have to derive power from the magnetic field of another NFC device when its internal batteries become too depleted. However, this magnetic field cannot provide adequate power for a user interface of the NFC device. For example, this magnetic field cannot provide adequate power to operate a touch-screen of a communication device into which a NFC is incorporated. Consequently, the operator of the communication device will no longer be able to operate and/or control the NFC device to conduct daily transactions unless its internal batteries are recharged.

Thus, there is a need for a way operate and/or control a NFC device when its internal batteries are so depleted that they cannot provide adequate power for operating a user interface. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 3:
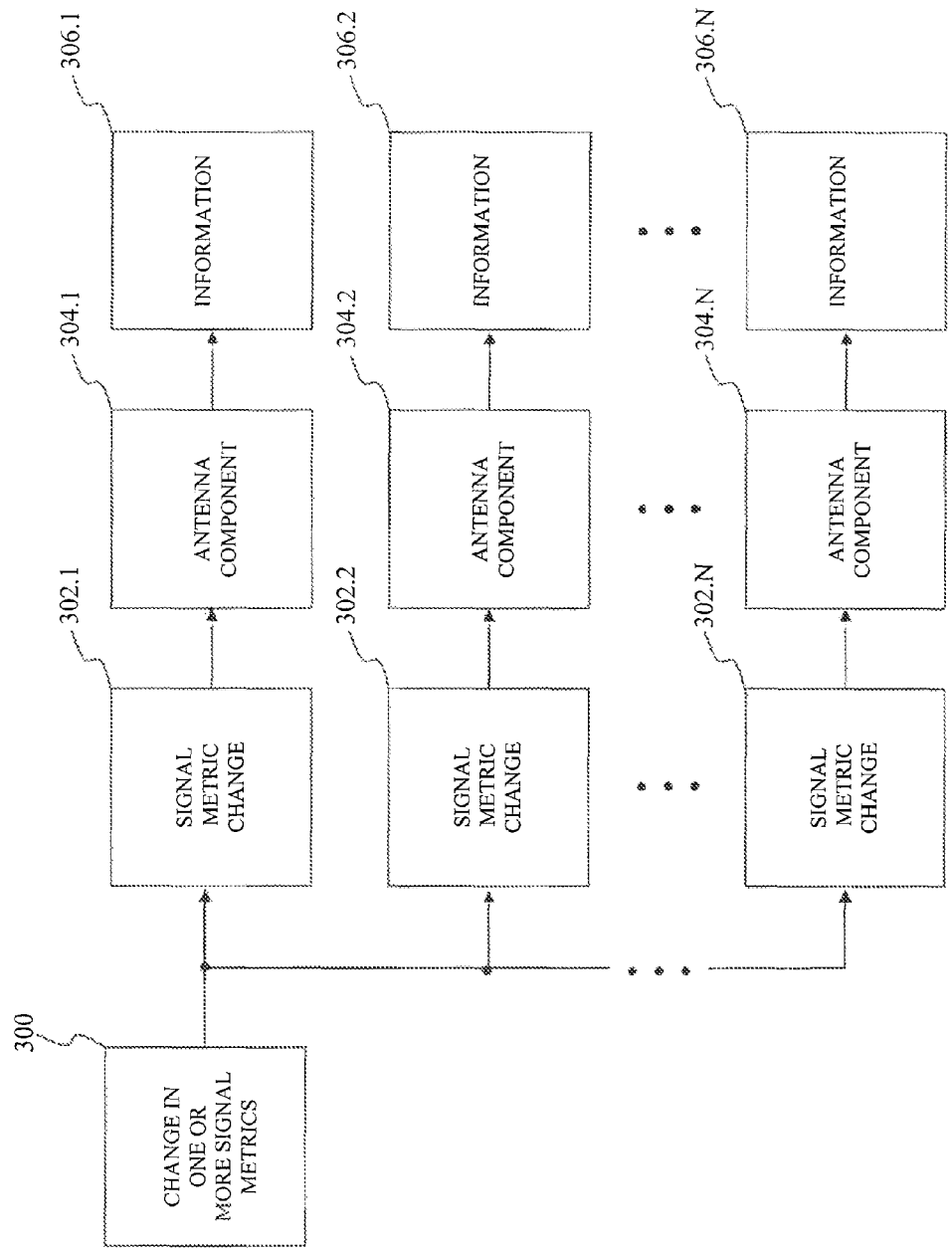
Figure 4:
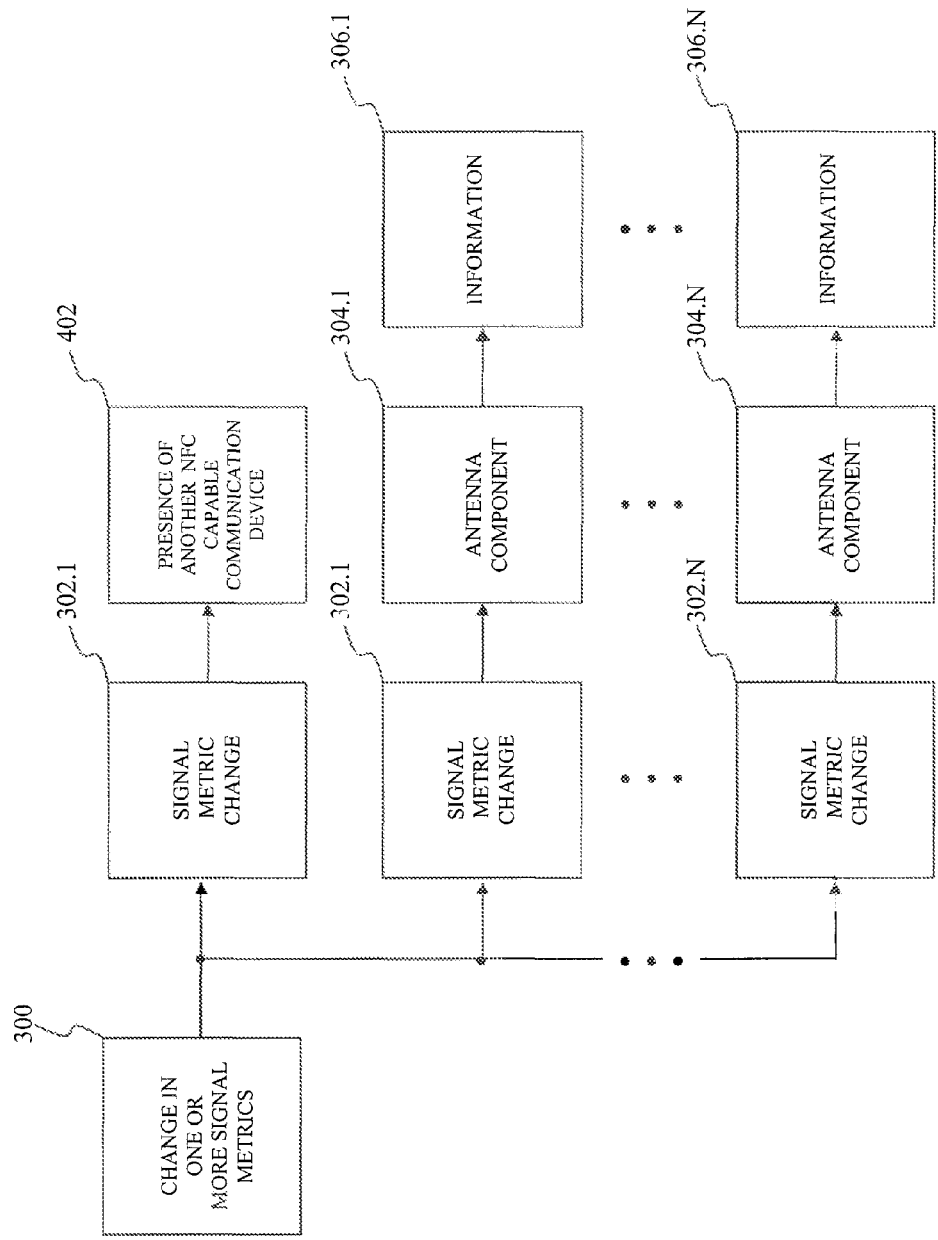
Figure 5:
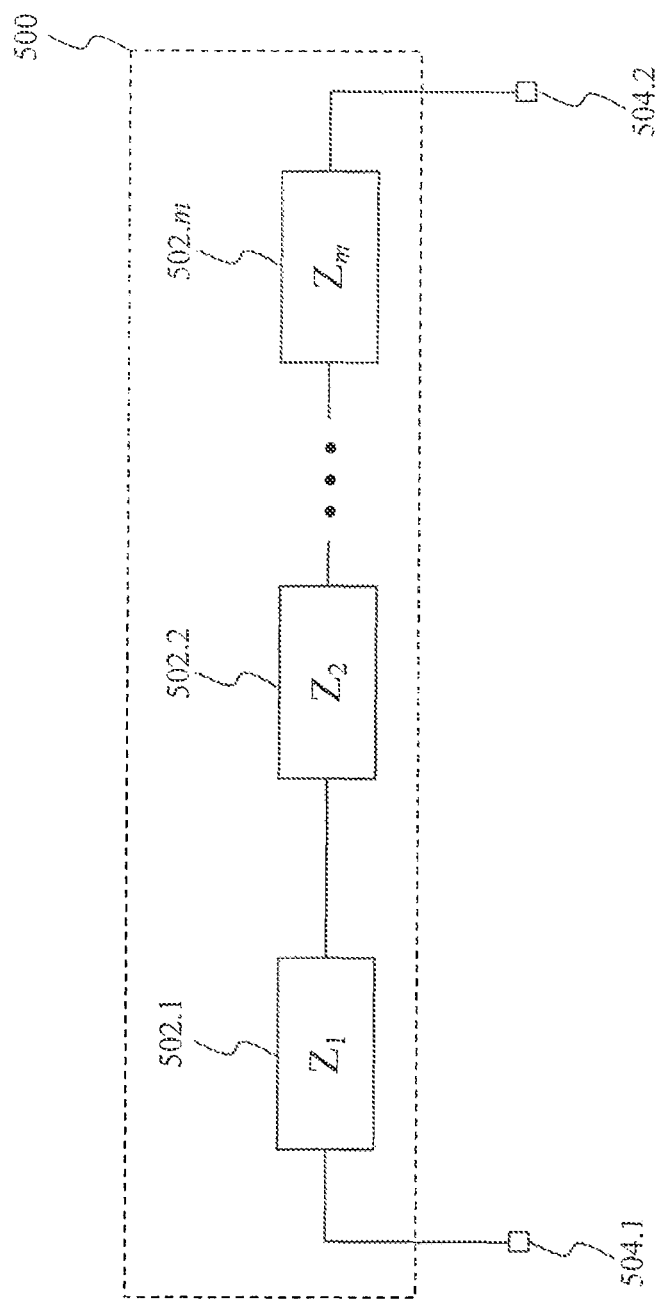
Figure 6:
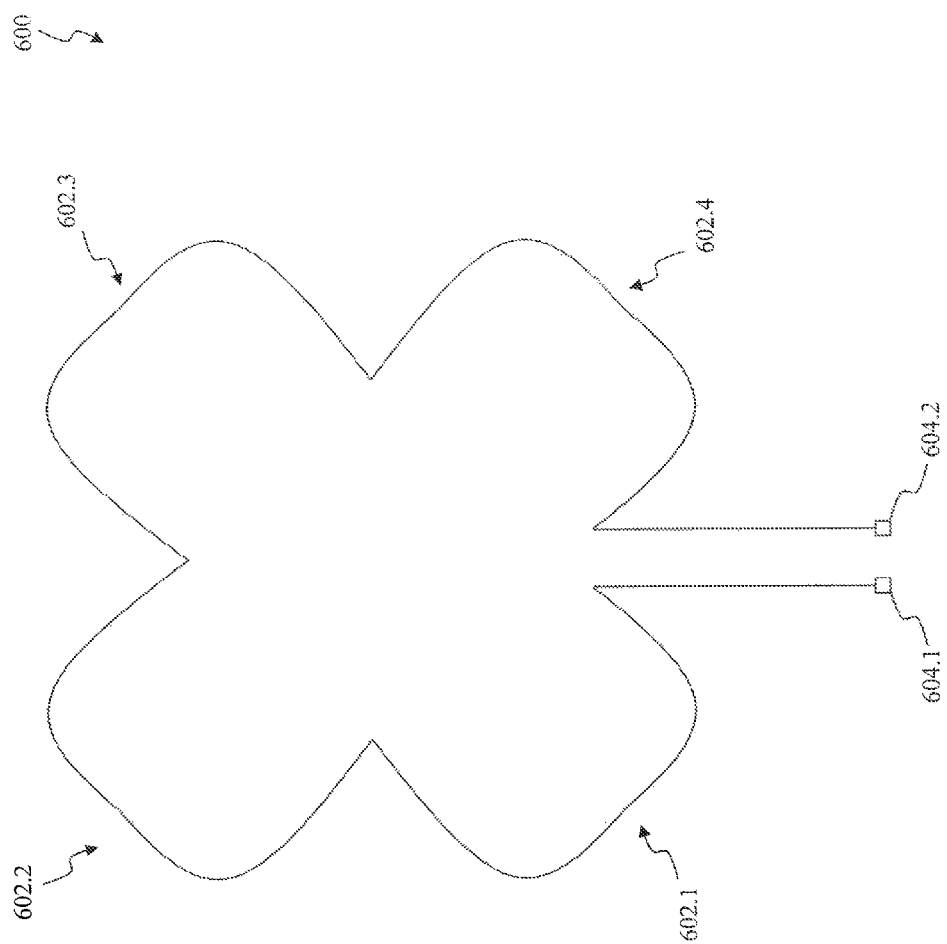
Figure 7:
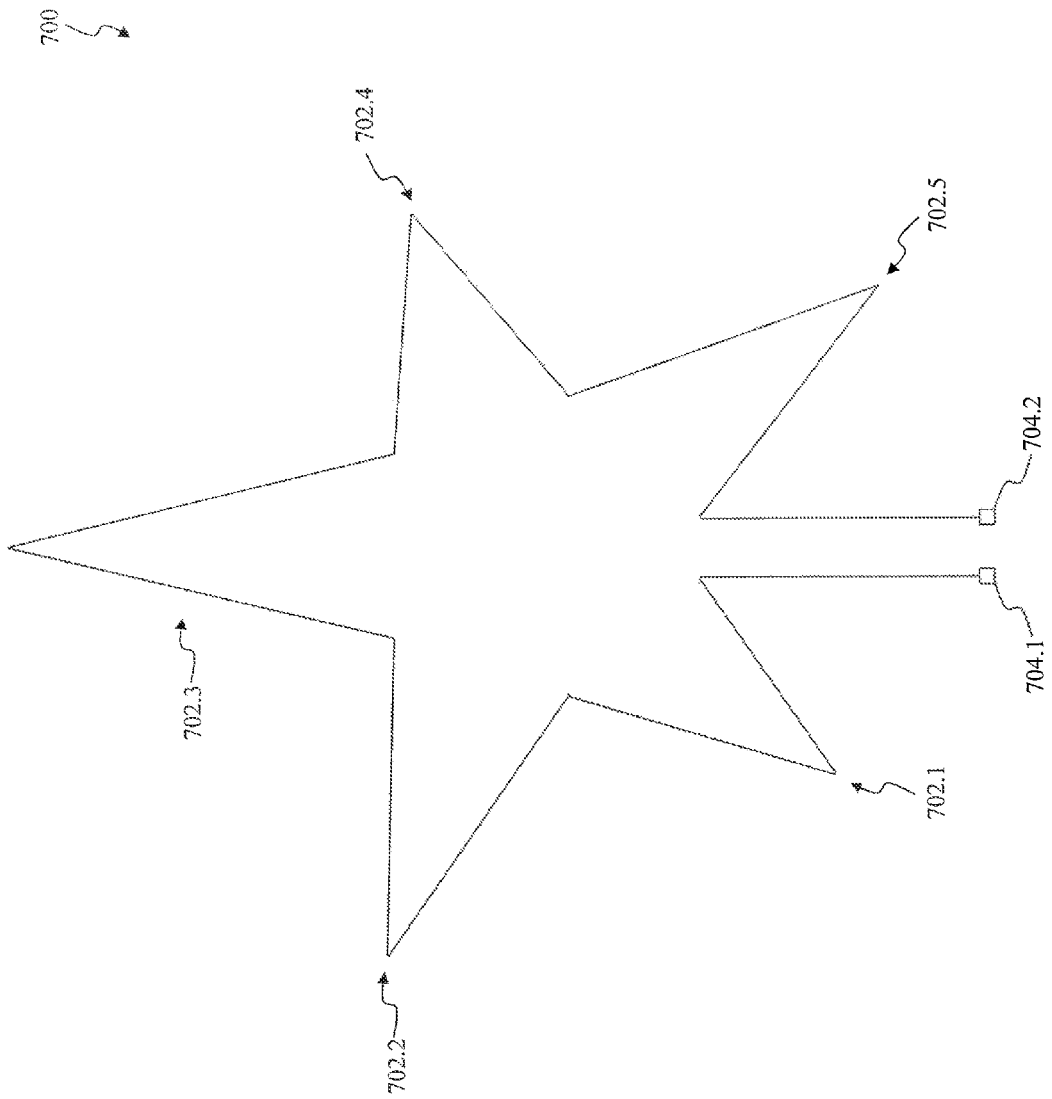
Figure 8A:
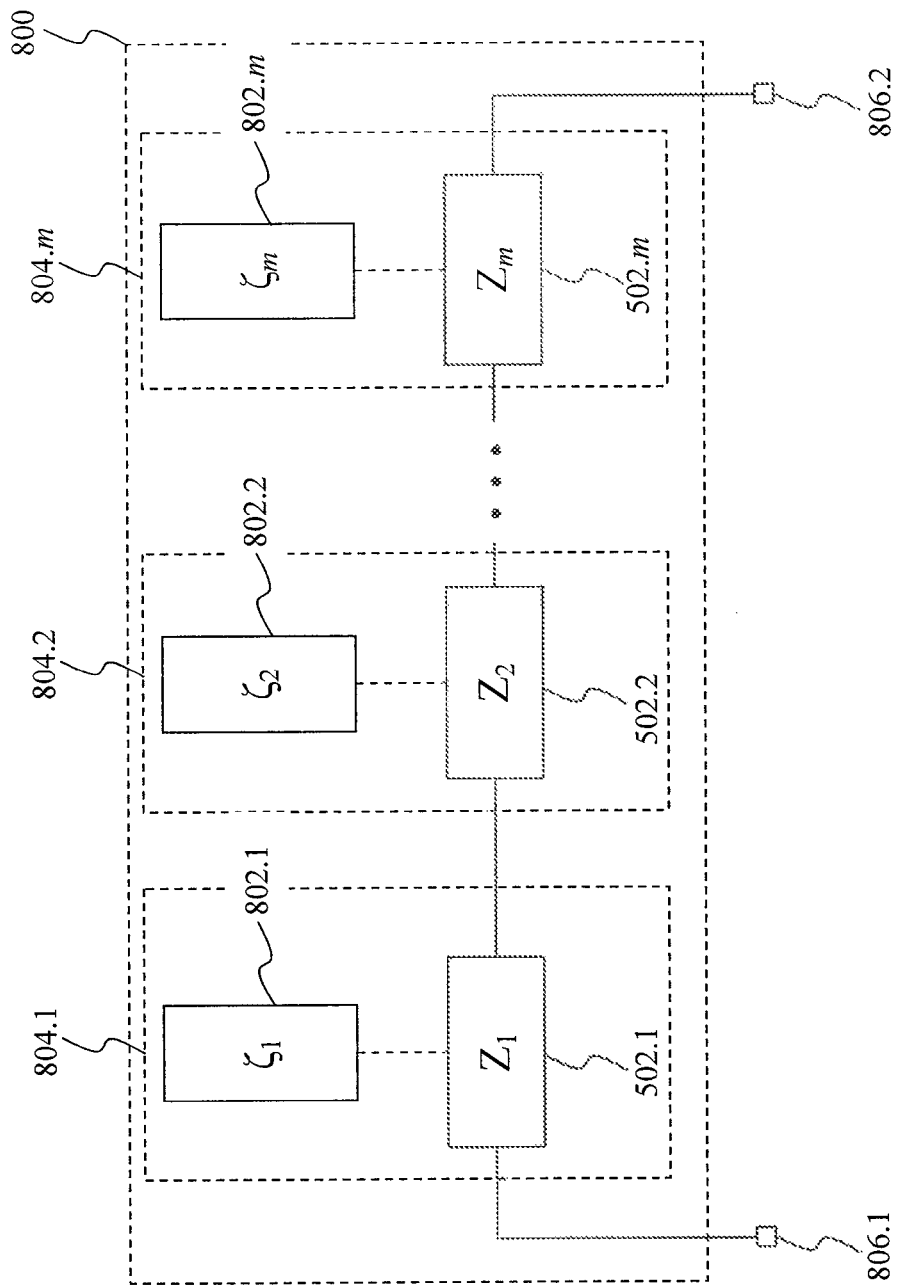
Figure 8B:
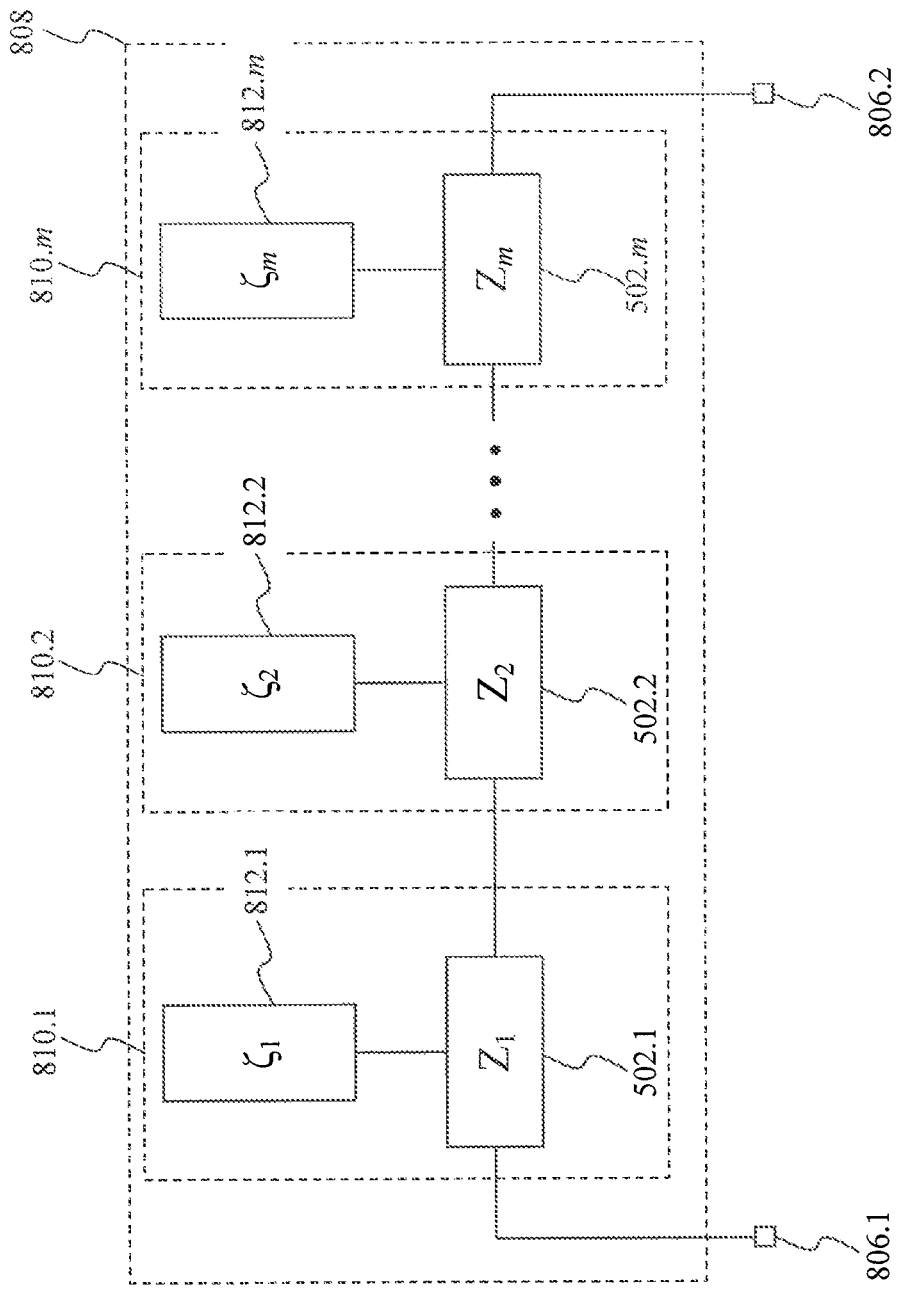
Figure 9:
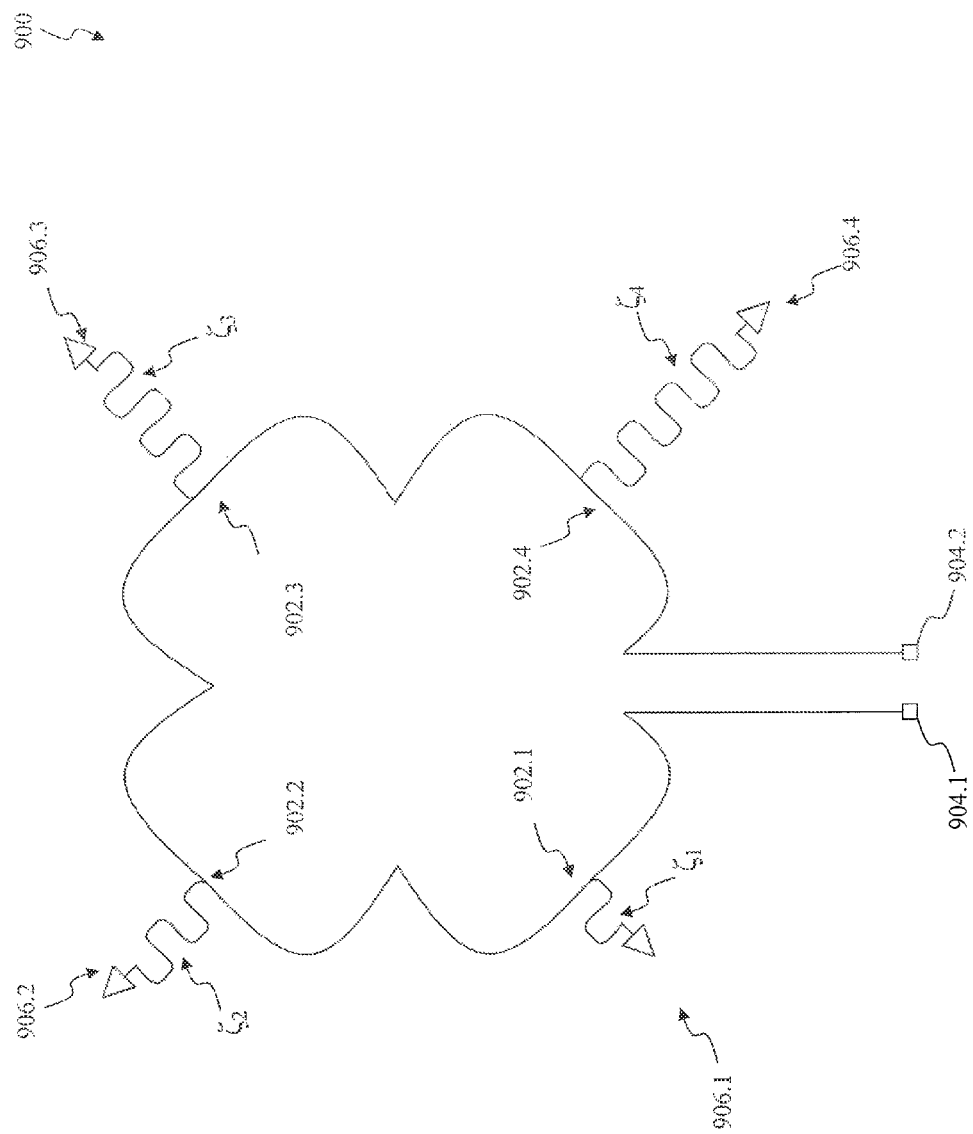
Figure 10:
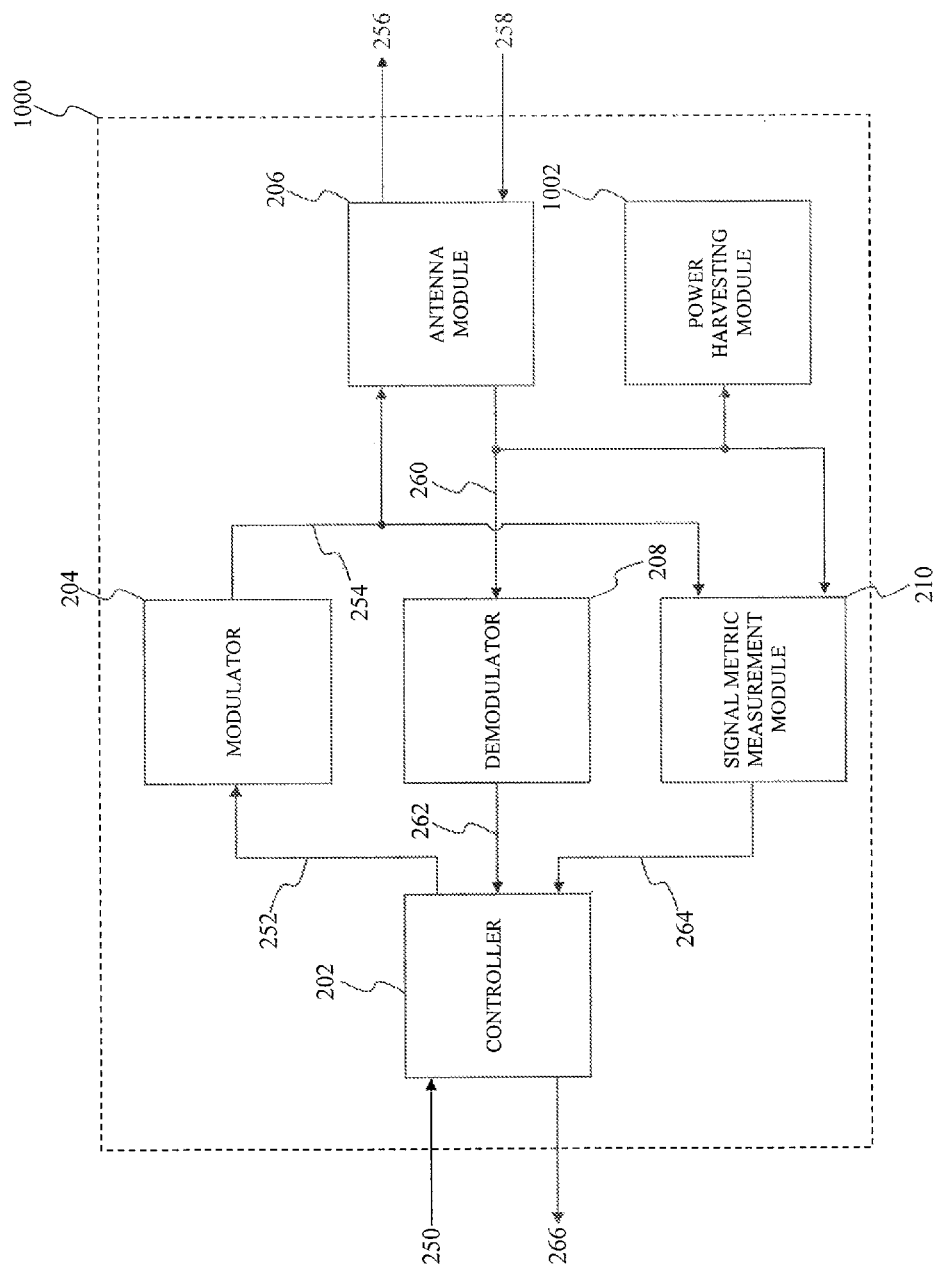
Figure 11:
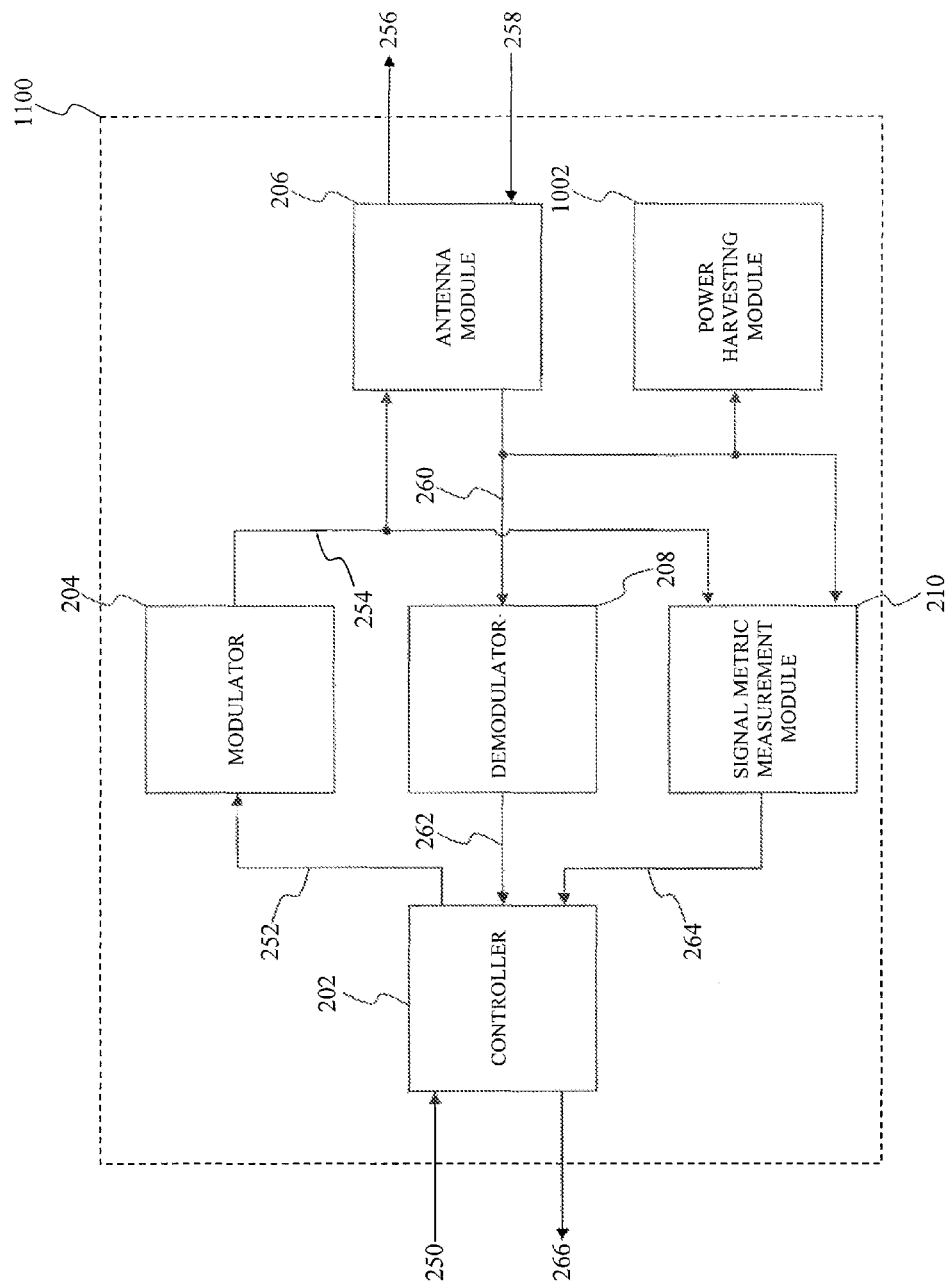

FIG. 3 graphically illustrates a first operation of the controller module to associate antenna components that have been touched by, or are sufficiently proximate to, the operator with information according to an exemplary embodiment of the invention;

FIG. 4 graphically illustrates a second operation of the controller module to associate the antenna components that have been touched by, or are sufficiently proximate to, the operator with information according to an exemplary embodiment of the invention;

FIG. 5 illustrates a first block diagram of an antenna element that is implemented as part of the antenna module according to an exemplary embodiment of the invention;

FIG. 6 illustrates a first symmetrical configuration of the antenna element according to an exemplary embodiment of the invention;

FIG. 7 illustrates an asymmetrical configuration of the antenna element according to an exemplary embodiment of the invention;

FIG. 8A illustrates a second block diagram of the antenna element that is implemented as part of the antenna module according to a first exemplary embodiment of the invention;

FIG. 8B illustrates the second block diagram of the antenna element that is implemented as part of the antenna module according to a second exemplary embodiment of the invention;

FIG. 9 illustrates a second configuration of the antenna element according to an exemplary embodiment of the invention;

FIG. 10 illustrates a block diagram of a second NFC device that is implemented as part of the NFC environment according to an exemplary embodiment of the invention; and FIG. 11 illustrates a block diagram of a third NFC device that is implemented as part of the NFC environment according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

Figure 1:
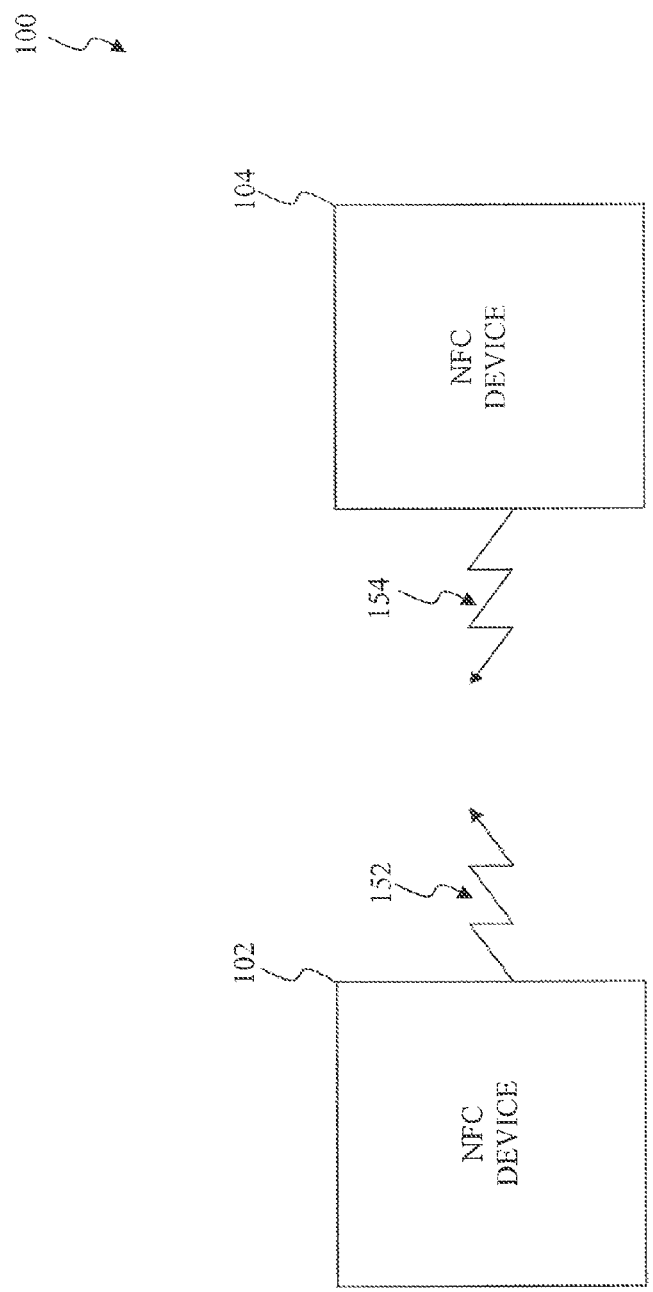
FIG. 1 illustrates a block diagram of a NFC environment according to an exemplary embodiment of the invention.

FIG. 1 illustrates a block diagram of a NFC environment according to an exemplary embodiment of the invention. A NFC environment 100 provides wireless communication of information, such as one or commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

Conventionally, an operator may operate and/or control the first NFC device 102 and/or the second NFC device 104 using a user interface, such as a touch-screen display, an alphanumeric keypad, a microphone, a mouse, a speaker, any other suitable user interface that will be apparent to those skilled in the relevant art(s) without departing from the spirit and scope of the invention, or any combination thereof. The user interface may be configured to allow the operator to provide information, such as data and/or one or more commands to provide some examples, to the first NFC device 102 and/or the second NFC device 104. Herein, information includes data that is to be transferred from a first NFC capable device to a second NFC capable device, data that is to be stored or used by the first NFC capable device and/or the second NFC capable device, data that is to be provided to the first NFC capable device and/or the second NFC capable device, data that is to be provided to an operator of the first NFC capable device and/or the second NFC capable device, or any combination thereof. Herein, a NFC capable device refers to an electrical device or host device that is integrated with a NFC device or the NFC device itself.

The information may also include one or more commands to be executed by the first NFC capable device and/or the second NFC capable device. The user interface may be configured to provide the information from the first NFC device 102 and/or the second NFC device 104 to the operator.

The operator may also operate and/or control the first NFC device 102 and/or the second NFC device 104 by touching, or being sufficiently proximate to, antenna components of a first antenna of the first NFC device 102 and/or antenna components of a second antenna of the second NFC device 104, respectively. This mode of operation is particularly useful when there is insufficient internal battery power available to provide sufficient power to the user interface. This mode of operation is also useful when the first NFC device 102 and/or the second NFC device 104 rely on power harvested from a communication signal to operate.

The operator may physically touch, such as a touch from a finger or a hand of the operator and/or a touch from other passive objects available to the operator such as a stylus to provide some examples, the antenna components of the first antenna and/or the second antenna to cause a change in a characteristic impedance of the antenna. The operator may be sufficiently proximate to the antenna components of the first antenna and/or the second antenna to cause the change in the characteristic impedance of the antenna. Touching of, or being sufficiently proximate to, the antenna components of the first antenna and/or the second antenna enable the operator to provide information to the first NFC device 102 and/or the second NFC device.

The first NFC device 102 and/or the second NFC device 104 interact with each other to exchange the information, in a peer (P2P) communication mode or a reader/writer (R/W) communication mode. In the P2P communication mode, the first NFC device 102 and the second NFC device 104 may be configured to operate according to an active communication mode and/or a passive communication mode. The first NFC device 102 modulates its corresponding information onto a first carrier wave, referred to as a modulated information communication, and generates a first magnetic field by applying the modulated information communication to the first antenna to provide a first information communication 152. The first NFC device 102 ceases to generate the first magnetic field after transferring its corresponding information to the second NFC device 104 in the active communication mode. Alternatively, in the passive communication mode, the first NFC device 102 continues to apply the first carrier wave without its corresponding information, referred to as an unmodulated information communication, to continue to provide the first information communication 152 once the information has been transferred to the second NFC device 104.

The first NFC device 102 is sufficiently proximate to the second NFC device 104 such that the first information communication 152 is inductively coupled onto a second antenna of the second NFC device 104. The second NFC device 104 demodulates the first information communication 152 to recover the information. The second NFC device 104 may respond to the information by modulating its corresponding information onto a second carrier wave and generating a second magnetic field by applying this modulated information communication to the second antenna to provide a second modulated information communication 154 in the active communication mode. Alternatively, the second NFC device 104 may respond to the information by modulating the second antenna with its corresponding information to modulate the first carrier wave to provide the second modulated information communication 154 in the passive communication mode.

In the R/W communication mode, the first NFC device 102 is configured to operate in an initiator, or reader, mode of operation and the second NFC device 104 is configured to operate in a target, or tag, mode of operation. However, this example is not limiting, those skilled in the relevant art(s) will recognize that the first NFC device 102 may be configured to operate in the tag mode and the second NFC device 104 may be configured to operate as in the reader mode in accordance with the teachings herein without departing from the spirit and scope of the present invention. The first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by modulating the second antenna with its corresponding information to modulate the first carrier wave to provide the second modulated information communication.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

A First Exemplary NFC Device

Figure 2:
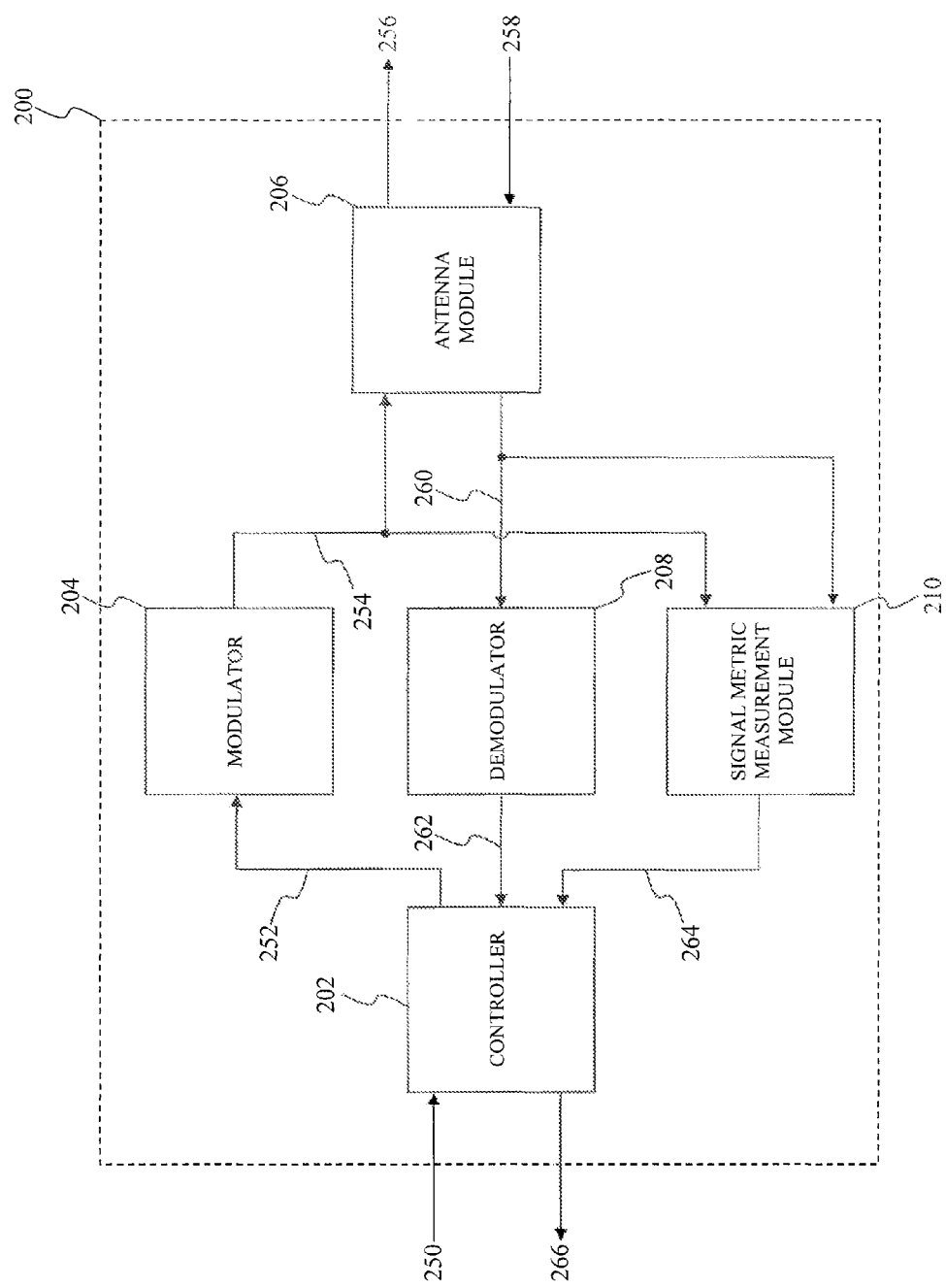
FIG. 2 illustrates a block diagram of a first NFC device that is implemented as part of the NFC environment according to an exemplary embodiment of the invention.

FIG. 2 illustrates a block diagram of a first NFC device that is implemented as part of the NFC environment according to an exemplary embodiment of the invention. A NFC device 200 is configured to operate in a reader mode of operation to initiate an exchange of information, such as data and/or one or more commands to provide some examples, with other NFC devices. An operator may operate and/or control the NFC device 200 using a user interface and/or may touch, or be sufficiently proximate to, an antenna module of the NFC device 200. For example, the operator may provide information to the NFC device 200 by touching, or being sufficiently proximate to, the antenna module. The NFC device 200 includes a controller module 202, a modulator module 204, an antenna module 206, a demodulator module 208, and a signal metric measurement module 210. The NFC device 200 may represent an exemplary embodiment of the first NFC device 102 and/or the second NFC device 104.

The controller module 202 controls overall operation and/or configuration of the NFC device 200. The controller module 202 receives information 250 from one or more data storage devices such as one or more contactless transponders, one or more contactless tags, one or more contactless smartcards, any other machine-readable mediums that will be apparent to those skilled in the relevant art(s) without departing from the spirit and scope of the invention, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 202 may also receive the information 250 from a user interface such as a touch-screen display, an alphanumeric keypad, a microphone, a mouse, a speaker, any other suitable user interface that will be apparent to those skilled in the relevant art(s) without departing from the spirit and scope of the invention to provide some examples. The controller module 202 may further receive the information 250 from other electrical devices or host devices coupled to the NFC device 200.

Typically, the controller module provides the information 250 as transmission information 252 for transmission to another NFC capable device. However, the controller module 202 may also use the information 250 to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC capable devices.

Additionally, the controller module 202 may format the information 250 into information frames and may perform error encoding, such as cyclic redundancy check (CRC) to provide an example, on the information frames to provide the transmission information 252. The information frames may include frame delimiters to indicate a start and/or an end of each of the information frames. The controller module 202 may additionally arrange multiple information frames to form sequences of information frames to synchronize and/or to calibrate the NFC device 200 and/or another NFC capable device. The sequences may include sequence delimiters to indicate a start and/or an end of each of the sequences.

Further, the controller module 202 may perform other functionality as described in International Standard ISO/IE 18092:2004(E), "Information Technology—Telecommunications and Information Exchange Between Systems—Near Field Conmmunication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

The modulator module 204 modulates the transmission information 252 onto a carrier wave, such as a radio frequency carrier wave having a frequency of approximately 13.56 MHz to provide an example, using any suitable analog or digital modulation technique to provide a modulated information communication as transmission information 254. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The modulator module 204 may continue to provide the carrier wave to provide an unmodulated information communication as the transmission information 254 once the transmission information 252 has been transferred to another NFC capable device. Alternatively, the modulator module 204 may cease to provide the transmission information 254 once the transmission information 252 has been transferred to another NFC capable device The antenna module 206 applies the transmission information 254 to an inductive coupling element, such as a resonant tuned circuit to provide an example, to generate a magnetic field to provide a transmitted information communication 256. Additionally, another NFC capable device may inductively couple a received communication signal 258 onto the inductive coupling element to provide a recovered communication signal 260. For example, this other NFC capable device may respond to the information by modulating its corresponding antenna with its corresponding information to modulate the carrier wave to provide the received communication signal 258. As another example, this other NFC capable device may modulate its corresponding information onto its corresponding carrier wave and generate its corresponding magnetic field by applying this modulated information communication to its corresponding antenna to provide the received communication signal 258.

The demodulator module 208 demodulates the recovered communication signal 260 using any suitable analog or digital modulation technique to provide reception information 262. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

Typically, the controller mode provides the reception information 262 as recovered information 266 to the data store, the user interface, and/or other electrical devices or host devices. However, the controller module 202 may also use the reception information 262 to control the overall operation and/or configuration of the NFC device 200. The reception information 262 may include one or more commands and/or data. The controller module 202 may issue and/or execute the one or more commands to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC capable devices.

Additionally, the controller module 202 formats the reception information 262 into a suitable format for transmission to the data store, the user interface, and/or other electrical devices or host devices, and may perform error decoding, such as cyclic redundancy check (CRC) decoding to provide an example, on the reception information 262 to provide recovered information 266.

The antenna module 206 may be additionally used to operate and/or control the NFC device 200. For example, the operator may touch, or be sufficiently proximate to, antenna components of the antenna module 206 to operate and/or control the NFC device 200. The antenna module 206 includes one or more antenna components that are configured and arranged to form the inductive coupling element. The operator's touching of, or sufficient proximity to, the antenna module 206 causes a change in at least one characteristic impedance of at least one antenna component. This change in characteristic impedance causes a change in one or more signal metrics of the transmission information 254 and/or the recovered communication signal 260. For example, the one or more signal metrics may change from a corresponding first signal metric to a corresponding second signal metric in response to the operator touching, or being sufficiently proximate to, the antenna module 206.

The signal metric measurement module 210 determines one or more signal metrics 264 of the transmission information 254 and/or the recovered communication signal 260. The one or more signal metrics 264 may include a mean voltage and/or current level, an average voltage and/or current level, an instantaneous voltage and/or current level, a root mean square voltage and/or current level, a mean power, an average power, an instantaneous power, a root mean square power, a frequency, a phase and/or any other suitable signal metric of the transmission information 254 and/or the recovered communication signal 260 which will be apparent to those skilled in the relevant art(s) without departing from the spirit and scope of the invention. Alternatively, the one or more signal metrics 264 may include one or more network parameters of the transmission information 254 and/or the recovered communication signal 260 such as one or more scattering parameters, commonly referred to a S-parameters, one or more admittance parameters, commonly referred to a Y-parameters, one or more impedance parameters, commonly referred to a Z-parameters, one or more scattering transfer parameters, commonly referred to as T-parameters, one or more nonlinear network parameters, commonly referred to as X-parameters, and/or any other suitable network parameter of the transmission information 254 and/or the recovered communication signal 260 which will be apparent to those skilled in the relevant art(s) without departing from the spirit and scope of the invention.

The controller module 202 determines a location of the antenna components that have been touched by, or are sufficiently proximate to, the operator based upon the one or more signal metrics 264 and associates the antenna components that have been touched by, or are sufficiently proximate to, the operator with information as to be discussed below.

Exemplary Operation of the Controller Module that is Implemented as Part of the First Exemplary NFC Device FIG. 3 graphically illustrates a first operation of the controller module to associate antenna components that have been touched by, or are sufficiently proximate to, the operator with information according to an exemplary embodiment of the invention. The controller module 202 associates the antenna components that have been touched by, or are sufficiently proximate to, the operator with information such as one or more commands and/or data.

The controller module 202 compares the one or more signal metrics 264 to one or more previous signal metrics to determine a change in the one or more signal metrics 300. The one or more previous signal metrics may represent one or more predetermined signal metrics of the transmission information 254 and/or the recovered communication signal 260 that have been determined by the signal metric measurement module 210 without the operator touching, or being sufficiently proximate to, the antenna components of the antenna module 206. Alternatively, the one or more previous signal metrics may represent one or more signal metrics of the transmission information 254 and/or the recovered communication signal 260 that were previously determined by signal metric measurement module 210. In another alternate, a manufacturer may determine the one or more previous signal metrics and/or the signal metric changes, or the signal metric ranges of changes, for each of the antenna components of the antenna module 206 which are then stored in a look-up table by the controller module 202 and/or the data store module at a time of manufacture. The manufacturer may determine a unique look-up table for a specific NFC device and/or may determine a generic look-up table for a series or family of NFC devices. This generic look-up table may be adapted by the operator for a specific NFC device that is being used by the operator and/or for other specific operator parameters, such as a size of the operator's hands to provide an example, using a calibration process.

The controller module 202 matches the change in the one or more signal metrics 300 with a corresponding signal metric change 302.1 through 302.N. Each of the signal metric changes 302.1 through 302.N may represent an expected change in the one or more signal metrics 300. The controller module 202 matches the change in the one or more signal metrics 300 that is closest to the expected change to determine a corresponding signal metric change 302.1 through 302.N. Alternatively, each of the signal metric changes 302.1 through 302.N may represent a range of expected changes in the one or more signal metrics 302. The controller module 202 matches the change in the one or more signal metrics 300 that is within to the expected range of changes to determine a corresponding signal metric change 302.1 through 302.N.

The controller module 202 associates the corresponding signal metric change 302.1 through 302.N with a corresponding antenna component 304.1 through 304.N to determine a location of the antenna components that have been touched by, or are sufficiently proximate to, the operator. For example, the controller module 202 associates the signal metric change 302.1 with the antenna component 304.1 to determine that the operator has touched, or is sufficiently proximate to, the antenna component 304.1.

The controller module 202 associates the corresponding antenna component 304.1 through 304.N with corresponding information 306.1 through 306.N. The corresponding information 306.1 through 306.N may represent possible information that may such as one or more commands and/or data. For example, the controller module 202 may associate the corresponding antenna component 304.1 with one or more commands to write data to another NFC capable device and/or one or more commands to read data from another NFC capable device. In this situation, the controller module 202 may execute the one or more commands to write data and/or to read data when the operator has touched, or is sufficiently proximate to, the antenna component 304.1. As another example, the controller module 202 may associate the corresponding antenna component 304.1 with one or more commands to execute a transaction. In this situation, the controller module 202 may execute the one or more commands to execute the transaction when the operator has touched, or is sufficiently proximate to, the antenna component 304.1. As a further example, the controller module 202 may associate the corresponding antenna component 304.1 through 304.N with data corresponding to one or more alphanumeric characters. Typically, the one or more alphanumeric characters include numbers 0 to 9, letters A to Z, and/or any other suitable character or symbol that will be apparent to those skilled in the relevant art(s) without departing from the spirit and scope of the present invention.

FIG. 4 graphically illustrates a second operation of the controller module to associate the antenna components that have been touched by, or are sufficiently proximate to, the operator with information according to an exemplary embodiment of the invention. The controller module 202 is configured to determine whether changes in the one or more signal metrics 264 result from one or more antenna components being touched by, or being sufficiently proximate to, the operator or result from another NFC capable device entering into the magnetic field generated by the NFC device 200. The second operation shares many substantially similar features to the first operation as described in FIG. 3; therefore, only differences between these two operations are to be discussed in further detail.

As shown in FIG. 4, one of the signal metric changes 302.1 through 302.N is associated with a presence of another NFC capable device entering into the magnetic field generated by the NFC device 200. The controller module 202 may detect the presence of this other NFC capable device when the change in the one or more signal metrics 300 corresponds to the signal metric change 302.1.

Exemplary Antenna Elements that are Implemented as Part of the First Exemplary NFC Device FIG. 5 illustrates a first block diagram of an antenna element that is implemented as part of the antenna module according to an exemplary embodiment of the invention. An antenna element 500 may generate a magnetic field to provide a transmitted information communication, such as the transmitted information communication 256 to provide an example. Other NFC capable devices may inductively couple a received communication signal, such as the received communication signal 258 to provide an example, onto the antenna element 500. Additionally, an operator may operate and/or control a NFC device, such as the first NFC device 102, the second NFC device 104, and/or the NFC device 200 to provide some examples, by touching, or being sufficiently proximate to, the antenna element 500. The antenna element 500 may represent an exemplary embodiment of the antenna module 206.

The antenna element 500 includes antenna components 502.1 through 502.$m$ that are configured and arranged in series with each other. For example, the antenna component 502.1 is coupled to the antenna component 502.2. The antenna component 502.1 is further coupled to a first connection 504.1 and the antenna component 502.*m* is further coupled to a second connection 504.2. Alternatively, each of the antenna components 502.1 through 502.*m* may be configured and arranged to be parallel with each other. In another alternative, a first group of the antenna components 502.1 through 502.*m* may be configured and arranged in series with each other and a second group of the antenna components 502.1 through 502.*m* may be configured and arranged to be parallel with each other.

Generally, each of the antenna components 502.1 through 502.*m* is implemented using any regular and/or irregular open geometric shape that will be apparent to those skilled in the relevant art(s) without departing from the spirit and scope of the present invention. Each of the antenna components 502.1 through 502.*m* may be symmetric, as shown in FIG. 6 to each other and/or asymmetric from each other as shown in FIG. 7; therefore, the characteristic impedances $Z_1$ through $Z_m$ may also be similar to each other and/or dissimilar from each other.

Additionally, as shown in FIG. 5, each of the antenna components 502.1 through 502.*m* is characterized having a corresponding characteristic impedance from among characteristic impedances $Z_1$ through $Z_m$. In an exemplary embodiment, adjacent antenna components from among the antenna components 502.1 through 502.*m* are configured to have different characteristic impedances.

The operator may touch, or be sufficiently proximate to, one or more of the antenna components 502.1 through 502.*m* to operate and/or control the NFC device. For example, the operator may touch one or more of the antenna components 502.1 through 502.*m* using a finger or a hand or through other passive objects available to the operator such as a stylus to provide an example. The operator's touching of, or sufficient proximity to, the antenna components 502.1 through 502.*m* causes a change in one or more of the characteristic impedances $Z_1$ through $Z_m$ that correspond to the one or more of the antenna components 502.1 through 502.*m* that have been touched, or are sufficiently proximate to, the operator. For example, the operator's touching of, or sufficient proximity to, the antenna component 502.1 may cause the characteristic impedance $Z_1$ to change from a first characteristic impedance to a second characteristic impedance.

The antenna element 500 may represent an inductor or coil of wire that is placed within the NFC capable device. For example, the antenna element 500 may be placed in a mechanical housing of the NFC capable device allowing the operator to touch, or be sufficiently proximate to, the mechanical housing to operate and/or control the NFC capable device. Typically, the antenna element 500 is positioned on a different side of the mechanical housing from the user interface, such as a side of the mechanical housing that is opposite of the user interface to provide an example. Alternatively, the antenna element 500 may be formed using a transparent conductor, such as indium tin oxide to provide an example, and integrated into the user interface. In another alternate, the antenna element 500 may represent a printed circuit that is formed onto a printed circuit substrate. In a further alternate, the antenna element 500 may be formed onto one or more semiconductor chips or dies using a semiconductor photolithographic process.

FIG. 6 illustrates a first symmetrical configuration of the antenna element according to an exemplary embodiment of the invention. An operator may operate and/or control a NFC device, such as the first NFC device 102, the second NFC device 104, and/or the NFC device 200 to provide some examples, by touching, or being sufficiently proximate to, one or more antenna components 602.1 through 602.4 of an antenna element 600. The antenna element 600 may represent an exemplary embodiment of the antenna element 500.

As shown in FIG. 6, the antenna element 600 includes antenna components 602.1 through 602.4 that are configured and arranged in series with each other. However this example is not limiting, those skilled in the relevant art(s) will recognize that the antenna element 600 may include more or less antenna components without departing from the spirit and scope of the invention. The antenna component 602.1 is further coupled to a first connection 604.1 and the antenna component 602.4 is further coupled to a second connection 604.2. The antenna components 602.1 through 602.4 may be characterized by a characteristic impedance from among characteristic impedances $Z_1$ through $Z_4$.

FIG. 7 illustrates an asymmetrical configuration of the antenna element according to an exemplary embodiment of the invention. An operator may operate and/or control a NFC device, such as the first NFC device 102, the second NFC device 104, and/or the NFC device 200 to provide some examples, by touching, or being sufficiently proximate, to antenna components 702.1 through 702.4 of an antenna element 700. The antenna element 700 may represent an exemplary embodiment of the antenna element 500.

As shown in FIG. 7, the antenna element 700 includes antenna components 702.1 through 702.5 configured and arranged in series with each other. However this example is not limiting, those skilled in the relevant art(s) will recognize that the antenna element 700 may include more or less antenna components without departing from the spirit and scope of the invention. The antenna component 702.1 is further coupled to a first connection 704.1 and the antenna component 702.5 is further coupled to a second connection 704.2.

FIG. 8A illustrates a second block diagram of an antenna element that is implemented as part of the antenna module according to a first exemplary embodiment of the invention. An antenna element 800 may generate a magnetic field to provide a transmitted information communication, such as the transmitted information communication 256 to provide an example. Other NFC capable devices may inductively couple a received communication signal, such as the received communication signal 258 to provide an example, onto the antenna element 800. Additionally, an operator may operate and/or control a NFC device, such as the first NFC device 102, the second NFC device 104, and/or the NFC device 200 to provide some examples, by touching, or being sufficiently proximate to, the antenna element 800. The antenna element 800 may represent an exemplary embodiment of the antenna module 206.

The antenna element 800 includes antenna components 804.1 through 804.*m* that are configured and arranged in series with each other. For example, the antenna component 804.1 is coupled to the antenna component 804.2. The antenna component 804.1 is further coupled to a first connection 806.1 and the antenna component 804.*m* is further coupled to a second connection 806.2. Alternatively, each of the antenna components 804.1 through 804.*m* may be configured and arranged to be parallel with each other. In another alternative, a first group of the antenna components 804.1 through 804.*m* may be configured and arranged in series with each other and a second group of the antenna components 804.1 through 804.*m* may be configured and arranged to be parallel with each other.

Each of the antenna components 804.1 through 804.*m* include a corresponding antenna component 502.1 through 502.*m* that is coupled to a corresponding antenna impedance element 802.1 through 802.*m*. Specifically, the antenna impedance elements 802.1 through 802.*m* are indirectly connected to their corresponding antenna component 502.1 through 502.*m* by an electric field that forms between one of the antenna components 502.1 through 502.*m* and the operator when the operator touches, or is sufficiently proximate to, one of the antenna impedance elements 804.1 through 804.*m*. An intensity of this electric field is based upon a corresponding characteristic impedance of the antenna impedance elements 802.1 through 802.*m*.

Typically, in a symmetric configuration, each of the antenna components 502.1 through 502.*m* may exhibit substantially similar changes in their corresponding characteristic impedances $Z_1$ through $Z_m$ when being touched by, or are sufficiently proximate to, the operator. However, each of the antenna impedance elements 802.1 through 802.*m* may exhibit substantially dissimilar changes in their corresponding characteristic impedances $\zeta_1$ through $\zeta_m$, when being touched by, or are sufficiently proximate to, the operator. As a result, the antenna components 804.1 through 804.*m* will exhibit substantially dissimilar changes in their corresponding characteristic impedances. However this example is not limiting, those skilled in the relevant art(s) will recognize that the antenna impedance elements 802.1 through 802.*m* may implemented as part of an asymmetrical configuration without departing from the spirit and scope of the present invention.

Generally, the antenna impedance elements 802.1 through 802.*m* are implemented using any regular and/or irregular geometric shape that is characterized by a corresponding characteristic impedance from among characteristic impedances $\zeta_1$ through $\zeta_m$. In an exemplary embodiment, the antenna impedance elements 802.1 through 802.*m* may be characterized as having substantially different characteristic impedances $\zeta_1$ through $\zeta_m$ from one another. For example, the antenna impedance element 802.1 is configured and arranged to form a first impedance element that is characterized as having a first number of turns. Likewise, the antenna impedance element 802.2 is configured and arranged to form a second impedance element that is characterized as having a second number of turns, the second number of turns being different from the first number of turns. In an exemplary embodiment, the antenna impedance elements 802.1 through 802.*m* are configured to be normal to their corresponding antenna components 502.1 through 502.*m* in three dimensional space such that a performance of the antenna element 800 in sending and/or receiving an information communication is negligibly affected by the antenna impedance elements 802.1 through 802.

It should be noted that the configuration of the antenna impedance elements 802.1 through 802.*m* as illustrated in FIG. 8 for illustrative purposes only, those skilled in the relevant art(s) will recognize that the antenna impedance elements 802.1 through 802.*m* may be oriented in any suitable direction in three dimensional space without departing from the spirit and scope of the present invention. Additionally, those skilled in the relevant art(s) will recognize that each of the antenna impedance elements 802.1 through 802.*m* may have substantially similar or dissimilar orientations to each other in the three dimensional space without departing from the spirit and scope of the present invention. For example, the antenna component 502.1 through 502.*m* antenna component 502.1 through 502.*m* may be implemented on a first plane in the three dimensional space and the antenna impedance elements 802.1 through 802.*m* may be implemented on a second plane in the three dimensional space such that the antenna impedance elements 802.1 through 802.*m* may be oriented to be substantially parallel to their corresponding antenna component 502.1 through 502.*m*.

The antenna element 800 may represent an inductor or coil of wire that is placed within the NFC device. The antenna element 800 may represent a printed circuit that is formed onto a printed circuit substrate. The antenna components 502.1 through 502.*m* may be formed on a layer of the printed circuit substrate and the antenna impedance elements 802.1 through 802.*m* may be also formed on the layer of the printed circuit substrate or other layers of the printed circuit without departing from the spirit and scope of the present invention. Alternatively, the antenna element 800 may be formed onto one or more semiconductor chips or dies using a semiconductor photolithographic process. The antenna components 502.1 through 502.*m* may be formed on one or more semiconductor chips or dies and the antenna impedance elements 802.1 through 802.*m* may be also formed on the one or more semiconductor chips or dies or other semiconductor chips or dies that are coupled to the one or more semiconductor chips or dies without departing from the spirit and scope of the present invention.

The operator may touch, directly with a finger or a hand or through other passive objects available to the operator such as a stylus, or be sufficiently proximate to, one or more of the antenna components 804.1 through 804.*m* to operate and/or control the NFC device. For example, the operator may touch, or be sufficiently proximate to, one or more of the antenna components 502.1 through 502.*m* and/or one or more of the antenna impedance elements 802.1 through 802.*m*. The operator's touching of, or sufficient proximity to, causes a change in a characteristic impedance of the one or more of the antenna components 804.1 through 804.*m*.

FIG. 8B illustrates the second block diagram of the antenna element that is implemented as part of the antenna module according to a second exemplary embodiment of the invention. An antenna element 808 may generate a magnetic field to provide a transmitted information communication, such as the transmitted information communication 256 to provide an example. Other NFC capable devices may inductively couple a received communication signal, such as the received communication signal 258 to provide an example, onto the antenna element 808. Additionally, an operator may operate and/or control a NFC device, such as the first NFC device 102, the second NFC device 104, and/or the NFC device 200 to provide some examples, by touching, or being sufficiently proximate to, the antenna element 808. The antenna element 808 may represent an exemplary embodiment of the antenna module 206. The antenna element 808 shares many substantially similar features as the antenna element 800; therefore, only differences between the antenna element 800 and the antenna element 808 are to be discussed in further detail.

The antenna element 808 includes antenna components 810.1 through 810.*m* that are configured and arranged in series with each other. Alternatively, each of the antenna components 810.1 through 810.*m* may be configured and arranged to be parallel with each other. In another alternative, a first group of the antenna components 810.1 through 810.*m* may be configured and arranged in series with each other and a second group of the antenna components 810.1 through 810.*m* may be configured and arranged to be parallel with each other. Each of the antenna components 810.1 through 810.*m* include a corresponding antenna component 502.1 through 502.*m* that is directly coupled to a corresponding antenna impedance element 812.1 through 812.*m*.

FIG. 9 illustrates a second configuration of the antenna element according to an exemplary embodiment of the invention. An operator may operate and/or control a NFC device, such as the first NFC device 102, the second NFC device 104, and/or the NFC device 200 to provide some examples, by touching, or being sufficiently proximate to, antenna components 902.1 through 902.4 of an antenna element 900. The antenna element 900 may represent an exemplary embodiment of the antenna element 500.

As shown in FIG. 9, the antenna element 900 includes antenna components 902.1 through 902.4 configured and arranged in series with each other. However this example is not limiting, those skilled in the relevant art(s) will recognize that the antenna element 900 may include more or less antenna components without departing from the spirit and scope of the invention. The antenna component 902.1 is further coupled to a first connection 904.1 and the antenna component 902.4 is further coupled to a second connection 904.2. The antenna components 902.1 through 902.4 may be characterized by a characteristic impedance from among characteristic impedances $Z_1$ through $Z_4$. Typically, the antenna components 902.1 through 902.4 may be characterized as being substantially symmetrical in configuration and arrangement from one another.

Each of antenna impedance elements 906.1 through 906.4 are either directly and/or indirectly coupled to a corresponding one of the antenna components 902.1 through 902.4. Generally, the antenna impedance elements 906.1 through 906.4 are implemented using any regular and/or irregular geometric shape that is characterized by a corresponding characteristic impedance from among characteristic impedances $\zeta_1$ through $\zeta_4$. Typically, the characteristic impedances $\zeta_1$ through $\zeta_4$ are characterized as being a substantially different from one another such that the effective characteristic impedances of the antenna components 902.1 through 902.4 are substantially different. Typically, the antenna impedance elements 906.1 through 906.4 are configured to be normal to their corresponding antenna components 902.1 through 902.4 such that a performance of the antenna element 900 in sending and/or receiving information is negligibly affected by the antenna impedance elements 904.1 through 906.4

A Second Exemplary NFC Device

FIG. 10 illustrates a block diagram of a second NFC device that is implemented as part of the NFC environment according to an exemplary embodiment of the invention. A NFC device 1000 is configured to operate in a target, or tag, mode of operation to respond to a request to exchange information, such as data and/or one or more commands to provide some examples, with another NFC capable device. An operator may operate and/or control the NFC device 1000 using a user interface and/or may touch, or be sufficiently proximate to, an antenna module of the NFC device 1000. For example, the operator may provide information to the NFC device 1000 by touching, or being sufficiently proximate to, the antenna module. The NFC device 1000 includes the controller module 202, the modulator module 204, the antenna module 206, the demodulator module 208, the signal metric measurement module 210, and a power harvesting module 1002. The NFC device 1000 may represent an exemplary embodiment of the first NFC device 102 and/or the second NFC device 104.

The NFC device 1000 shares many substantially similar features as the NFC device 200; therefore, only differences between the NFC device 200 and the NFC device 1000 are to be discussed in further detail. The power harvesting module 1000 may harvest a power source from the received communication signal 258. The power source may include sufficient power to adequately operate the controller module 202, the modulator module 204, the antenna module 206, the demodulator module 208, and/or the signal metric measurement module 210.

A Third Exemplary NFC Device

FIG. 11 illustrates a block diagram of a third NFC device that is implemented as part of the NFC environment according to an exemplary embodiment of the invention. A NFC device 1110 is configured to operate in a communicator mode of operation to initiate an exchange of information, such as data and/or one or more commands to provide some examples, with other NFC capable devices and to respond to a request to exchange the information from other NFC capable devices. An operator may operate and/or control the NFC device 1110 using a user interface and/or may touch, or be sufficiently proximate to, an antenna module of the NFC device 1100. For example, the operator may provide information to the NFC device 1100 by touching, or being sufficiently proximate to, the antenna module. The NFC device 1110 includes the controller module 202, the modulator module 204, the antenna module 206, the demodulator module 208, the signal metric measurement module 210, and the power harvesting module 1002. The NFC device 1100 may represent an exemplary embodiment of the first NFC device 102 and/or the second NFC device 104.

The NFC device 1100 is configured to operate in a substantially similar manner as the NFC device 200 when operating in an initiator, or reader, mode of operation or in a substantially similar manner as the NFC device 1000 when operating in a target, or tag, mode of operation. The NFC device 1100 may be configured to operate in the reader mode of operation to initiate a communication with another NFC capable device. Alternatively, the NFC device 1100 may be configured to operate in the tag mode of operation to respond to a request from another NFC capable device to initiate communication.

Conclusion

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A communications device, comprising:
   an antenna module, having a plurality of antenna components, configured to receive a communications signal, the plurality of antenna components comprising:
   a plurality of geometric shapes coupled in series, each of the plurality of geometric shapes being characterized by a corresponding characteristic impedance from among a plurality of characteristic impedances, the corresponding characteristic impedance being configured to change in response to an operator being sufficiently proximate to its corresponding geometric shape;

a signal metric measurement module, coupled to the antenna module, configured to determine a signal metric, the signal metric changing from a first metric value to a second metric value in response to the operator being sufficiently proximate to a geometric shape from among the plurality of geometric shapes; and a controller module configured to:
determine a change between the first metric value and the second metric value, and
determine a location of the geometric shape that is sufficiently proximate to the operator based upon the change, wherein the antenna module, the signal metric measurement module, and the controller module are further configured to control operation of the communications device in response to the communications device being configured to operate on power harvested from the communications signal.

2. The communications device of claim 1, wherein a characteristic impedance, from among the plurality of characteristic impedances, corresponding to the geometric shape that is sufficiently proximate to the operator changes from a first impedance value to a second impedance value when the operator is sufficiently proximate to the geometric shape.

3. The communications device of claim 2, wherein the change in the characteristic impedance causes the change between the first metric value and the second metric value.

4. The communications device of claim 1, wherein the signal metric changes from the first metric value to the second metric value in response to the operator touching to the geometric shape.

5. A communications device, comprising:
an antenna module, having a plurality of antenna components, configured to receive a communications signal;
a signal metric measurement module, coupled to the antenna module, configured to determine a signal metric, the signal metric changing from a first metric value to a second metric value in response to an operator being sufficiently proximate to an antenna component from among the plurality of antenna components; and
a controller module configured to:
compare the signal metric to a previous signal metric to determine a change between the first metric value and the second metric value,
match the change between the first metric value and the second metric value with a signal metric change from among a plurality of signal metric changes, and
associate the signal metric change with the antenna component to determine a location of the antenna component that is sufficiently proximate to the operator,
wherein the antenna module, the signal metric measurement module, and the controller module are further configured to control operation of the communications device in response to the communications device being configured to operate on power harvested from the communications signal.

6. The communications device of claim 5, wherein the controller module is further configured to associate the antenna component with information from among a plurality of information.

7. The communications device of claim 5, wherein the previous signal metric comprises:

a predetermined signal metric that has been determined by the signal metric measurement module without the operator being sufficiently proximate to the antenna component.

8. The communications device of claim 1, wherein the plurality of geometric shapes is configured and arranged to form at least one selected from a group consisting of:
a symmetrical antenna; and
an asymmetrical antenna.

9. The communications device of claim 1, wherein the plurality of antenna components further comprises:
a plurality of antenna impedance elements, each of the plurality of antenna impedance elements being coupled to a corresponding geometric shape from among the plurality of geometric shapes.

10. A communications device, comprising:
an antenna module having a plurality of antenna components, the plurality of antenna components comprising:
a plurality of geometric shapes coupled in series, each of the plurality of geometric shapes being characterized by a corresponding characteristic impedance from among a plurality of characteristic impedances, the corresponding characteristic impedance being configured to change in response to an operator being sufficiently proximate to its corresponding geometric shape,
wherein the antenna module is configured to receive a communications signal from a magnetic field generated by a second communications device, a signal metric of the received communications signal changing from a first metric value to a second metric value in response to an operator being sufficiently proximate to a geometric shape from among the plurality of geometric shapes; and
a controller module configured to:
determine a change between the first metric value and the second metric value, and
determine a location of the geometric shape that is sufficiently proximate to the operator based upon the change,
wherein the antenna module and the controller module are further configured to control operation of the communications device in response to the communications device being configured to operate on power harvested from the received communications signal.

11. The communications device of claim 10, wherein a characteristic impedance, from among the plurality of characteristic impedances, corresponding to the geometric shape that is sufficiently proximate to the operator changes from a first impedance value to a second impedance value when the operator is sufficiently proximate to the geometric shape.

12. The communications device of claim 11, wherein the change in the characteristic impedance causes the change between the first metric value and the second metric value.

13. The communications device of claim 10, wherein the signal metric changes from the first metric value to the second metric value in response to the operator touching to the geometric shape.

14. A communications device, comprising:
an antenna module, having a plurality of antenna components, configured to receive a communications signal from a magnetic field generated by a second communications device, wherein a signal metric of the received communications signal changes from a first metric value to a second metric value in response to an operator being sufficiently proximate to an antenna component from among the plurality of antenna components; and
a controller module configured to:

compare the signal metric to a previous signal metric to determine a change between the first metric value and the second metric value, match the change between the first metric value and the second metric value with a signal metric change from among a plurality of signal metric changes, and associate the signal metric change with the antenna component to determine a location of the antenna component that is sufficiently proximate to the operator, wherein the antenna module and the controller module are further configured to control operation of the communications device in response to the communications device being configured to operate on power harvested from the received communications signal.

15. The communications device of claim 14, wherein the controller module is further configured to associate the antenna component with information from among a plurality of information.

16. The communications device of claim 14, wherein the previous signal metric comprises:

a predetermined signal metric that has been determined without the operator being sufficiently proximate to the antenna component.

17. The communications device of claim 10, wherein the plurality of geometric shapes is configured and arranged to form at least one selected from a group consisting of:

a symmetrical antenna; and an asymmetrical antenna.

18. The communications device of claim 10, wherein the plurality of antenna components further comprises:

a plurality of antenna impedance elements, each of the plurality of antenna impedance elements being coupled to a corresponding geometric shape from among the plurality of geometric shapes.

19. The communications device of claim 1, wherein the communications device is configured to operate in a tag mode of operation.

20. The communications device of claim 10, wherein the communications device is configured to operate in a tag mode of operation.

* * * * *

UNITED STATES PATENT AND TRADEMARK OFFICE
CERTIFICATE OF CORRECTION

PATENT NO. : 9,105,965 B2  Page 1 of 1
APPLICATION NO. : 13/157572
DATED : August 11, 2015
INVENTOR(S) : Cox et al.

It is certified that error appears in the above-identified patent and that said Letters Patent is hereby corrected as shown below:

Title Page, Item (74), please replace "Sterne, Kessler, Goldstein & Forr, P.L.L.C." with --Sterne, Kessler, Goldstein & Fox, P.L.L.C.--.

Signed and Sealed this
Fifteenth Day of March, 2016

Michelle K. Lee
*Director of the United States Patent and Trademark Office*